Aug. 23, 1966 J. C. LITTMANN 3,267,751
RACK AND PINION ASSEMBLY
Filed July 1, 1963 2 Sheets-Sheet 1

INVENTOR.
JOSEPH C. LITTMANN
BY Whittemore,
Hulbert & Belknap
ATTORNEYS

Aug. 23, 1966  J. C. LITTMANN  3,267,751
RACK AND PINION ASSEMBLY
Filed July 1, 1963  2 Sheets-Sheet 2
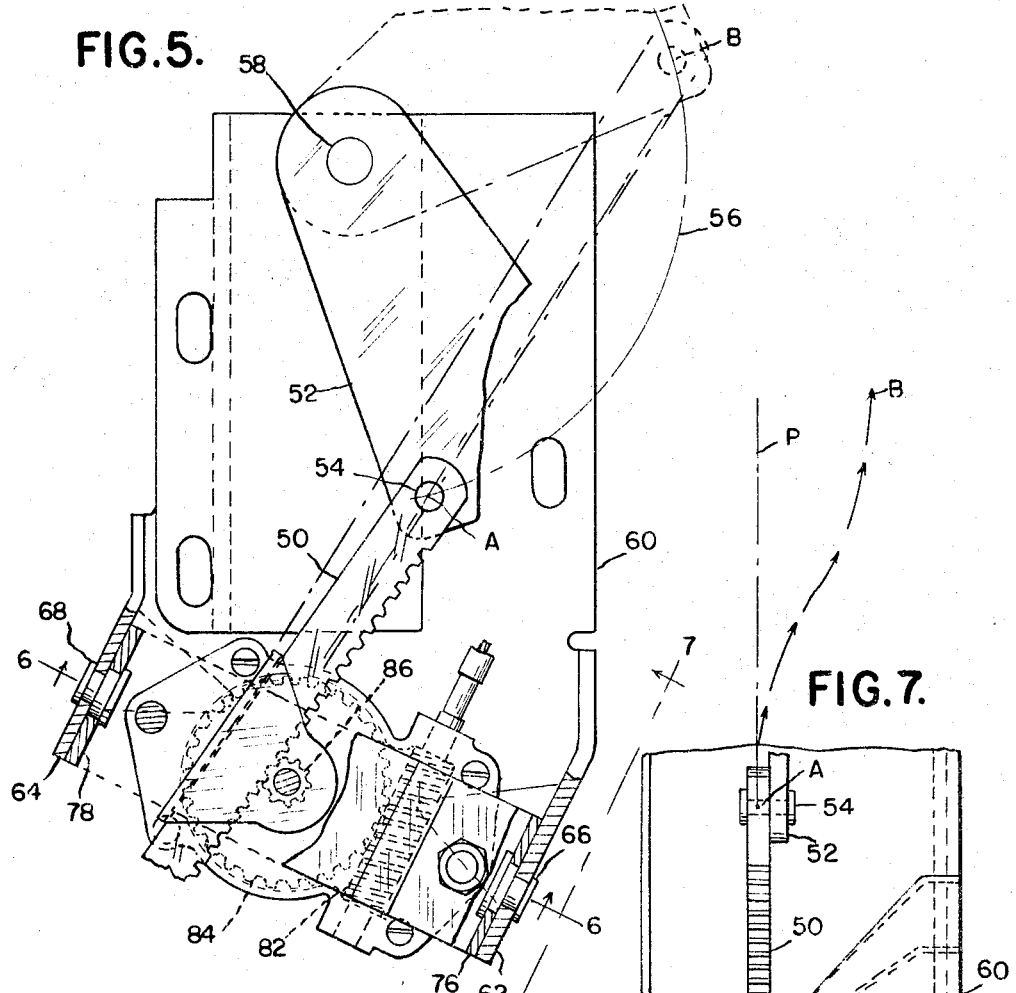
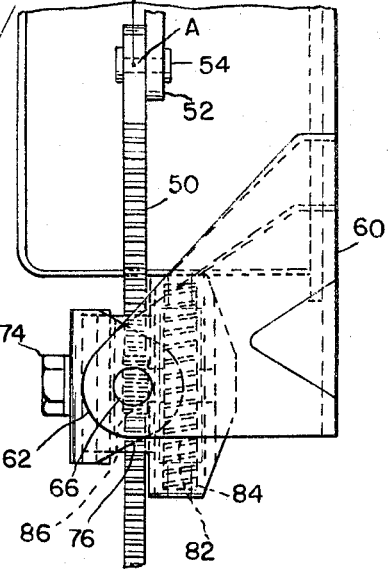
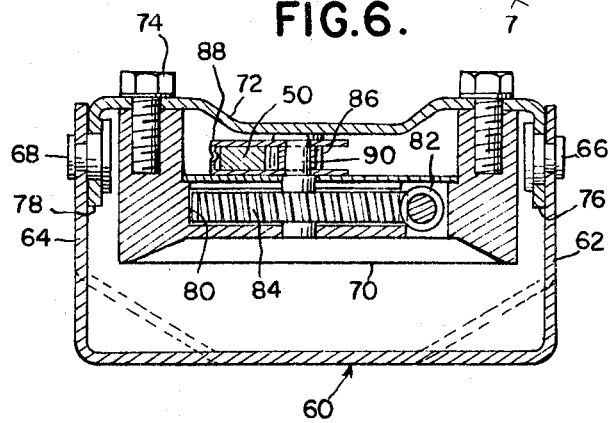
INVENTOR.
JOSEPH C. LITTMANN
BY
ATTORNEYS

United States Patent Office 3,267,751
Patented August 23, 1966

3,267,751
RACK AND PINION ASSEMBLY
Joseph C. Littmann, Grosse Pointe Woods, Mich., assignor to Ferro Manufacturing Corporation, a corporation of Michigan
Filed July 1, 1963, Ser. No. 291,661
6 Claims. (Cl. 74—89.11)

The present invention relates to a rack and pinion assembly, and more particularly to such an assembly in which the rack is required to combine swinging movement about the axis of the pinion with longitudinal movement due to rotation of the pinion.

It is an object of the present invention to provide a rack and pinion assembly including means to maintain the rack in fully meshed relation with respect to the pinion during combined longitudinal movement and swinging movement about the axis of the pinion.

It is a further object of the present invention to provide a rack and pinion assembly as described in the preceding paragraph in which the rack is provided with a straight rear edge opposite its toothed edge and in which the bearing retainer comprises means slidably engaged with the straight rear edge of the rack and mounted for swinging movement about the axis of the pinion.

It is a further object of the present invention to provide a rack and pinion assembly as described in the preceding paragraph in which the bearing retainer includes widely spaced bearing means engageable with the straight rear edge of the rack, said bearing means being substantially uniformly spaced from a line perpendicular to the rack and passing through the axis of the pinion.

It is a further object of the present invention to provide actuating means for lifting devices of a convertible top including a swinging arm, a drive pinion spaced substantially from the axis of the swinging arm, a rack having one end pivoted to the swinging arm and in meshed engagement with the pinion, and a rack retainer including bearing means engageable with the back edge of the rack to retain the rack in fully meshed engagement with the pinion.

It is a further object of the present invention to provide an actuator for moving a portion of a driven member in a path of compound curvature which includes a rack and pinion device, and pivot mounting means therefor whose axis is angularly related and preferably perpendicular to the axis of the pinion.

Other objects and features of the invention will become apparent as the description proceeds, especially when taken in conjunction with the accompanying drawings, illustrating preferred embodiments of the invention, wherein:

FIGURE 5 is an elevational view with parts broken away, of a preferred embodiment of the invention.

FIGURE 6 is a view on the line 6—6, FIGURE 5.

FIGURE 7 is a fragmentary elevational view looking in the direction of the arrows 7—7, FIGURE 5.

Figure 1:
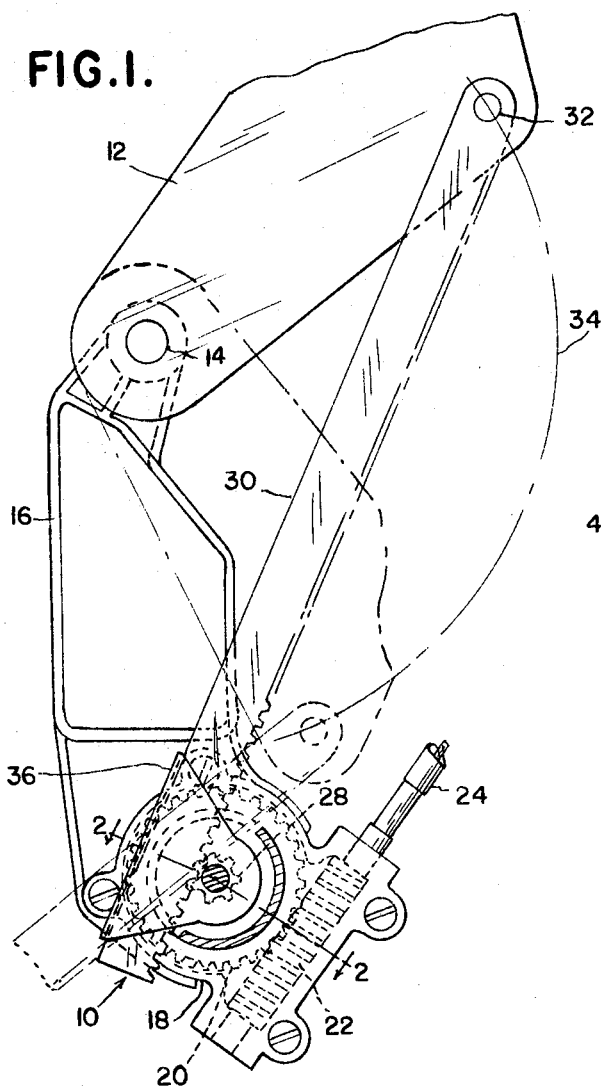
FIGURE 1 is a fragmentary elevational view of a portion of the top lift assembly, and actuating mechanism including the rack and pinion assembly.
Figure 2:
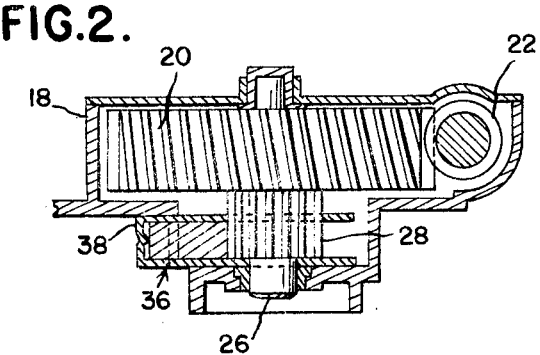
FIGURE 2 is an enlarged sectional view on the line 2—2, FIGURE 1.

As best seen in FIGURES 1 and 2, there is provided power actuating means indicated generally at 10 for the convertible top of an automotive vehicle. The top includes an arm, a portion of which is indicated at 12, the arm being pivoted as indicated at 14 to a mounting bracket 16. As the convertible top is raised and lowered, the arm 12 swings from the full line position to the dotted line position indicated in FIGURE 1.

The power means for raising and lowering the convertible top includes a housing 18 in which is rotatably mounted a worm gear 20 in mesh with a worm 22, the worm being driven by suitable means such for example as a flexible drive cable indicated at 24 and adapted to be driven in forward and reverse directions by suitable means such for example as an electric motor.

The worm gear 20 is keyed or otherwise secured to a shaft 26 and the shaft also carries a pinion 28 which is in meshed engagement with an elongated rack 30. One end of the rack is pivoted as indicated at 32 to the arm 12. As will be apparent, rotation of the flexible drive cable 24 drives the worm which in turn drives the worm gear and pinion, and the pinion drives the rack 30 in order to raise and lower the convertible top. Since the arm 12 is mounted for swinging movement about the fixed pivot support 14, the end of the rack 30 which is connected to the arm 12 swings in the arcuate path indicated at 34. In order to permit this swinging movement of the end of the rack, the rack is required to combine longitudinal movement with swinging movement about the axis of the pinion 28. The housing 18 is cut away to provide for the aforesaid movement of the rack 30. In order to maintain the rack in properly meshed relation with the pinion during its combined longitudinal and swinging movement, a rack retainer 36 is provided. The rack retainer is formed of sheet metal formed into the U-shaped cross-sectional configuration best illustrated in FIGURE 2, and comprises a web portion 38 and leg portions 40 and 42. One of the leg portions, as for example the leg portion 40, is provided with a relatively large opening 44 of a size to receive the pinion 28 for rotation therein. The other leg portion 42 is provided with a smaller opening 46 shaped to receive the portion of the shaft 26 beyond one end of the pinion 28, all as best illustrated in FIGURE 2. The rack retainer 36 is accordingly mounted for swinging movement about the axis of the shaft 26.

Figure 3:
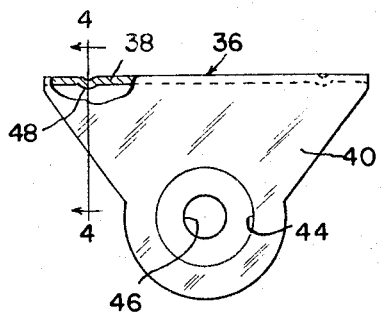
FIGURE 3 is an elevational view of the rack retainer with parts broken away.
Figure 4:
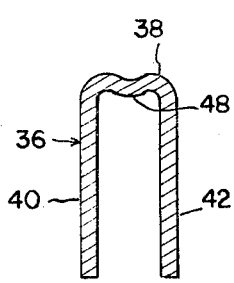
FIGURE 4 is an enlarged sectional view on the line 4—4, FIGURE 3.

The web portion 38 of the rack retainer is substantially elongated, as best appears in FIGURE 3, and is provided with a pair of bearing portions 48 which are engageable with the smooth straight back edge of the rack 30. The bearing portions 48 are preferably formed by inwardly dimpling the material of the web 38 so as to provide smoothly rounded bearing portions adapted to have minimum area contact with the rack 30. It will be observed from FIGURE 3 that the bearing portions 48 are widely spaced substantially equal distances from a line passing through the axes of the openings 44 and 46 and perpendicular to the length of the rack 30. Accordingly, as the rack 30 swings in the course of its operation, adequate forces are applied to the bearing retainer to cause it to swing in conformity with the swinging component of the movement of the rack and thus, to avoid any tendency of the bearing retainer to bind. The bearing portions 48 may be of generally spherical configuration as suggested in FIGURES 3 and 4, or, to increase area of contact, they may be of cylindrical cross-section extending transversely of the web 38 between the legs 40 and 42.

With the foregoing construction the rack is retained against radial displacement with respect to the pinion and is thus maintained always in the proper condition of mesh, despite its required longitudinal and swinging movement.

In some cases the portion of the drive member to which the free end of the rack is connected is required to move in a path having a compound curvature. In other words, the path of movement required of the free end of the rack does not occupy a single plane perpendicular to the axis of the pinion. An actuator designed to provide for this compound movement is illustrated in FIGURES 5–7.

Referring first to FIGURES 5 and 7 it will be observed that the rack 50 has its free end connected to a drive member 52 by means of a pivot connection 54. The geometry of the mechanism of which the member 52 is a part is such that the pivot connection, in moving from the point A to the point B follows a path of compound curvature. As viewed in FIGURE 5, the path indicated by the line 56 appears to be arcuate about the axis of pivot connection 58 of the member 52. However, as viewed in a direction at 90 degrees from the direction of view illustrated in FIGURE 5, the pivot connection 54 in moving from point A to point B moves out of the initial plane P perpendicular to the axis of the pinion when the parts occupy the full line positions illustrated in FIGURES 5 and 6.

In order to accommodate this compound movement of the pivot connection 54, there is provided a pivot mounting 60 having laterally spaced parallel ears 62 and 64 apertured to receive coaxial pins 66 and 68. The actuator housing 70 is provided with a cover member 72 which is bolted to the housing by bolts indicated at 74. The cover 72 includes laterally projecting ears 76 and 78 which are connected to the ears 62 and 64 by the pivot pins 66 and 68.

Located within a central cavity 80 within the housing are the worm 82 and the worm gear 84, the latter being rigidly connected to the pinion 86. The pinion 86 is located in the housing 70 so that its axis is perpendicular to and intersects the axes of the pivot pins 66 and 68.

The rack 50 is retained in mesh with the pinion 86 by the pinion retainer 88 which is identical with the pinion retainer 36 previously described. The pinion retainer 88 is mounted for angular movement about the axis of the shaft 90 carrying the pinion 86 so that the rack 50 is permitted longitudinal movement as a result of rotation of the pinion 86 as well as angular movement about the axis of the shaft 90. In addition to this movement, which would permit the free end of the rack to move in an arcuate path in a plane perpendicular to the axis of the pinion 86, a further movement is provided for by the pivot mounting including the pivot pins 66 and 68. This of course makes provision for the component of the compound curvature which is illustrated by the arrows connecting the points A and B in FIGURE 7.

The drawings and the foregoing specification constitute a description of the improved rack and pinion assembly in such full, clear, concise and exact terms as to enable any person skilled in the art to practice the invention, the scope of which is indicated by the appended claims.

What I claim as my invention is:

1. An actuator for moving a portion of a driven member in a path of compound curvature comprising a housing, a pivot mounting for said housing, a pinion within said housing having its axis disposed angularly with respect to the axis of said pivot mounting, a rack having a smooth rear edge and teeth in mesh with said pinion, a rack retainer mounted for swinging movement about the axis of said pinion, said rack retainer having means slidably engaging the rear edge of said rack to retain it in proper mesh with said pinion while providing for angular movement about the axis of said pinion as well as longitudinal movement thereof resulting from rotation of said pinion.

2. An actuator for moving a portion of a driven member in a path of compound curvature comprising a housing, a pivot mounting for said housing, a pinion within said housing having its axis disposed angularly with respect to the axis of said pivot mounting, a rack having a smooth rear edge and teeth in mesh with said pinion, a rack retainer mounted for swinging movement about the axis of said pinion, said rack retainer having means slidably engaging the rear edge of said rack to retain it in proper mesh with said pinion while providing for angular movement about the axis of said pinion as well as longitudinal movement thereof resulting from rotation of said pinion, and drive means connected to said pinion.

3. An actuator for moving a portion of a driven member in a path of compound curvature comprising a housing, a pivot mounting for said housing, a pinion within said housing having its axis disposed angularly with respect to the axis of said pivot mounting, a rack having a smooth rear edge and teeth in mesh with said pinion, a rack retainer mounted for swinging movement about the axis of said pinion, said rack retainer having means slidably engaging the rear edge of said rack to retain it in proper mesh with said pinion while providing for angular movement about the axis of said pinion as well as longitudinal movement thereof resulting from rotation of said pinion, and worm and worm gear drive means connected to said pinion.

4. An actuator for moving a portion of a driven member in a path of compound curvature comprising a housing, a pivot mounting for said housing, a pinion within said housing having its axis disposed angularly with respect to the axis of said pivot mounting, a rack having a smooth rear edge and teeth in mesh with said pinion, a rack retainer mounted for swinging movement about the axis of said pinion, said rack retainer having means slidably engaging the rear edge of said rack to retain it in proper mesh with said pinion while providing for angular movement about the axis of said pinion as well as longitudinal movement thereof resulting from rotation of said pinion, a worm gear connected to said pinion, a worm in mesh with said worm gear, and flexible cable drive means connected to said worm.

5. An actuator for moving a portion of a driven member in a path of compound curvature comprising a housing, a pivot mounting for said housing, a pinion within said housing having its axis disposed at right angles to the axis of said pivot mounting, a rack having a smooth rear edge and teeth in mesh with said pinion, a rack retainer mounted for swinging movement about the axis of the said pinion, said rack retainer having means slidably engaging the rear edge of said rack to retain it in proper mesh with said pinion while providing for angular movement about the axis of said pinion as well as longitudinal movement thereof resulting from rotation of said pinion.

6. An actuator for moving a portion of a driven member in a path of compound curvature comprising a housing, a pivot mounting for said housing, a pinion within said housing having its axis disposed at right angles to and intersecting the axis of said pivot mounting, a rack having a smooth rear edge and teeth in mesh with said pinion, a rack retainer mounted for swinging movement about the axis of said pinion, said rack retainer having means slidably engaging the rear edge of said rack to retain it in proper mesh with said pinion while providing for angular movement about the axis of said pinion as well as longitudinal movement thereof resulting from rotation of said pinion.

References Cited by the Examiner
UNITED STATES PATENTS

| | | | |
|---|---|---|---|
| 1,878,976 | 9/1932 | Morse et al. | 268—107 X |
| 2,119,399 | 5/1938 | Muschong | 74—91 |
| 2,187,067 | 1/1940 | Yow | 308—3.6 |
| 2,230,140 | 1/1941 | Falcon | 296—117 |
| 2,865,684 | 12/1958 | Meyer et al. | 308—3.6 |

MILTON KAUFMAN, *Primary Examiner.*

F. E. BAKER, *Assistant Examiner.*